United States Patent
Followell et al.

(10) Patent No.: US 10,453,277 B2
(45) Date of Patent: Oct. 22, 2019

(54) VEHICLE MONITORING SYSTEM THAT DYNAMICALLY VARIES DATA ACQUISITION

(71) Applicant: The Boeing Company, Chicago, IL (US)

(72) Inventors: David A. Followell, Wildwood, MO (US); Kevin Swearingen, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 162 days.

(21) Appl. No.: 15/817,904

(22) Filed: Nov. 20, 2017

(65) Prior Publication Data

US 2019/0156596 A1 May 23, 2019

(51) Int. Cl.
| | |
|---|---|
| G07C 5/08 | (2006.01) |
| G01D 9/00 | (2006.01) |
| G05B 19/042 | (2006.01) |
| G05B 21/02 | (2006.01) |
| H04L 12/40 | (2006.01) |
| B64D 45/00 | (2006.01) |
| G06F 12/06 | (2006.01) |

(52) U.S. Cl.
CPC ............. G07C 5/085 (2013.01); B64D 45/00 (2013.01); G01D 9/005 (2013.01); G05B 19/042 (2013.01); G05B 21/02 (2013.01); G06F 12/063 (2013.01); H04L 12/4013 (2013.01); H04L 12/40143 (2013.01); *B64D 2045/0085* (2013.01); *G05B 2219/2637* (2013.01); *G05B 2219/45071* (2013.01); *H04L 2012/4028* (2013.01); *H04L 2012/40273* (2013.01)

(58) Field of Classification Search
CPC .................................................. G07C 5/085
See application file for complete search history.

(56) References Cited

U.S. PATENT DOCUMENTS 5,375,250 A * 12/1994 Van den Heuvel ... G06F 15/173
706/41

FOREIGN PATENT DOCUMENTS

| EP | 2000394 A9 | 3/2009 |
|---|---|---|
| WO | 2006130984 A1 | 12/2006 |
| WO | 2013184924 A1 | 12/2013 |

OTHER PUBLICATIONS

European Search Report; Application 18205915.4-1216.
Bus (computing); Wikipedia Nov. 16, 2017, online at https://en.wikipedia.org/wiki/Bus_(computing).

* cited by examiner

*Primary Examiner* — Calvin Cheung
(74) *Attorney, Agent, or Firm* — Duft & Bornsen, PC

(57) ABSTRACT

Systems and methods are provided for retrieving values from a data bus of a vehicle. One illustrative method includes applying values from sensors at a vehicle to addresses of a data bus at the vehicle, retrieving values from the addresses of the data bus based on an operational state of the vehicle, and determining that the vehicle has entered another operational state. The method further includes loading a second sampling scheme corresponding with the other operational state, and retrieving values from an address of the data bus at a new rate corresponding with the other operational state.

23 Claims, 6 Drawing Sheets

FIG. 2

PARAMETER LIST — 200

| SYSTEM | PARAMETER | NOMINAL | MINIMUM | MAXIMUM | BUS ADDRESS |
|---|---|---|---|---|---|
| MOTOR | CURRENT | 1 KHZ | 100 HZ | 100 KHZ | FFA535 |
| MOTOR | ACCELERATION | 2 KHZ | 1 KHZ | 20 KHZ | 1F5B41 |
| MOTOR | TEMPERATURE | 1 HZ | 1 HZ | 1 HZ | 9952C7 |
| DOOR | POSITION | 1 KHZ | 1 HZ | 1 KHZ | 54F2D2 |
| WING FLAP | POSITION | 100 HZ | 10 HZ | 1 KHZ | 53124E |
| LANDING GEAR | FLUID TEMP | 1 HZ | 1 HZ | 100 HZ | CCAD12 |
| APU | OUTPUT AMPS | 1 KHZ | 10 HZ | 2 KHZ | 045220 |
| APU | LOAD | 1 KHZ | 10 HZ | 2 KHZ | 21E1A3 |

*FIG. 3*
OPERATIONAL STATES

| TYPE | STATE | PRIORITY | SAMPLING SCHEME | TRIGGER |
|---|---|---|---|---|
| VEHICLE | TAKEOFF | 30 | 1 | ENGINER POWER > 80% AND ALTITUDE < 10000 |
| VEHICLE | CLIMB | 40 | 2 | ALTITUDE < 30000 |
| VEHICLE | CRUISE | 75 | 3 | ALTITUDE BETWEEN 28000 AND 34000 |
| VEHICLE | HIGH G MANEUVER | 8 | 4 | ENGINE POWER > 90% |
| VEHICLE | DESCEND | 22 | 5 | WING FLAP ANGLE < 20 DEGREES |
| VEHICLE | LAND | 20 | 6 | ALTITUDE < 5000 |
| SYSTEM | MOTOR DEGRADE | 14 | 7 | ENGINE POWER < 20% |
| SYSTEM | APU FLUCTUATION | 62 | 8 | APU AMPS < 20 AMPS |

*FIG. 4*
SAMPLING SCHEME

| SYSTEM | PARAMETER | RETRIEVAL RATE | RANK |
|---|---|---|---|
| MOTOR | CURRENT | 100 KHZ | 12 |
| MOTOR | ACCELERATION | 20 KHZ | 15 |
| MOTOR | TEMPERATURE | 1 HZ | 6 |
| DOOR | POSITION | - | 190 |
| WING FLAP | POSITION | - | 30 |
| LANDING GEAR | FLUID TEMP | - | 80 |
| APU | OUTPUT AMPS | - | 112 |
| APU | LOAD | - | 114 |

VEHICLE MONITORING SYSTEM THAT DYNAMICALLY VARIES DATA ACQUISITION

FIELD

The disclosure relates to the field of vehicles, and in particular, to monitoring the health of vehicles.

BACKGROUND

Vehicle health monitoring is a process by which sensor and other data describing a vehicle is retrieved and analyzed. Such analysis may facilitate an understanding of the viability of individual systems within the vehicle, or even the health of the vehicle as a whole. Vehicle health monitoring may also provide information that enables predictive maintenance of various components of the vehicle. For example, vehicle health monitoring may facilitate scheduling for both maintenance of parts and replacement of parts at the vehicle.

Present vehicle health monitoring systems for aircraft track a predetermined number of parameters. However, the amount of bandwidth available for tracking parameters is limited. This lack of bandwidth in turn limits the number of parameters that may be sampled, as well as the sampling rates of these parameters. In aircraft that may be monitored using hundreds of thousands of parameters, this limitation is problematic.

Therefore, it would be desirable to have a method and apparatus that take into account at least some of the issues discussed above, as well as other possible issues.

SUMMARY

Embodiments described herein dynamically select which parameters to record, and/or rates at which to retrieve values for those parameters, based on the operational state of the vehicle and/or its individual systems. As used herein, an "operational state" is a condition experienced by the vehicle or one of its systems, such as a condition experienced while the vehicle is actively operating. The dynamic techniques used by the embodiments described herein allow for a much wider variety of parameters to be tracked during vehicle operations, and without exceeding existing bandwidth limitations in a computer that manages the vehicle. Furthermore, these dynamic techniques allow for targeted and granular analysis of individual systems.

One embodiment is a system that includes a data bus at a vehicle, sensors at the vehicle which provide values that are applied to addresses of the data bus such that each address of the data bus corresponds with a different sensor at the vehicle, and a vehicle monitoring system coupled with the data bus via a communication channel. The vehicle monitoring system includes a controller, implemented by a processor, that identifies sampling schemes stored in a memory that each define rates at which values are retrieved from the addresses of the data bus and stored in records, and that each correspond with a different operational state of the vehicle. The controller retrieves values from the addresses of the data bus via the communication channel based on a first sampling scheme that corresponds with an operational state and is stored in the memory, determines that the vehicle has entered another operational state based on the records, loads a second sampling scheme that corresponds with the other operational state and is stored in the memory, and retrieves values from an address of the data bus via the communication channel at a new rate defined by the second sampling scheme.

A further embodiment is a method that includes applying values from sensors at a vehicle to addresses of a data bus at the vehicle, retrieving values from the addresses of the data bus based on an operational state of the vehicle, and determining that the vehicle has entered another operational state. The method further includes loading a second sampling scheme corresponding with the other operational state, and retrieving values from an address of the data bus at a new rate corresponding with the other operational state.

A further embodiment is a non-transitory computer readable medium embodying programmed instructions which, when executed by a processor, are operable for performing a method. The method includes applying values from sensors at a vehicle to addresses of a data bus at the vehicle, retrieving values from the addresses of the data bus based on an operational state of the vehicle, and determining that the vehicle has entered another operational state. The method further includes loading a second sampling scheme corresponding with the other operational state, and retrieving values from an address of the data bus at a new rate corresponding with the other operational state.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 2 is a table illustrating a parameter list in an illustrative embodiment.

FIG. 3 is a table illustrating operational states of a vehicle in an illustrative embodiment.

FIG. 4 is a table illustrating a sampling scheme defining rates for retrieving values from one or more addresses of a data bus in an illustrative embodiment.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
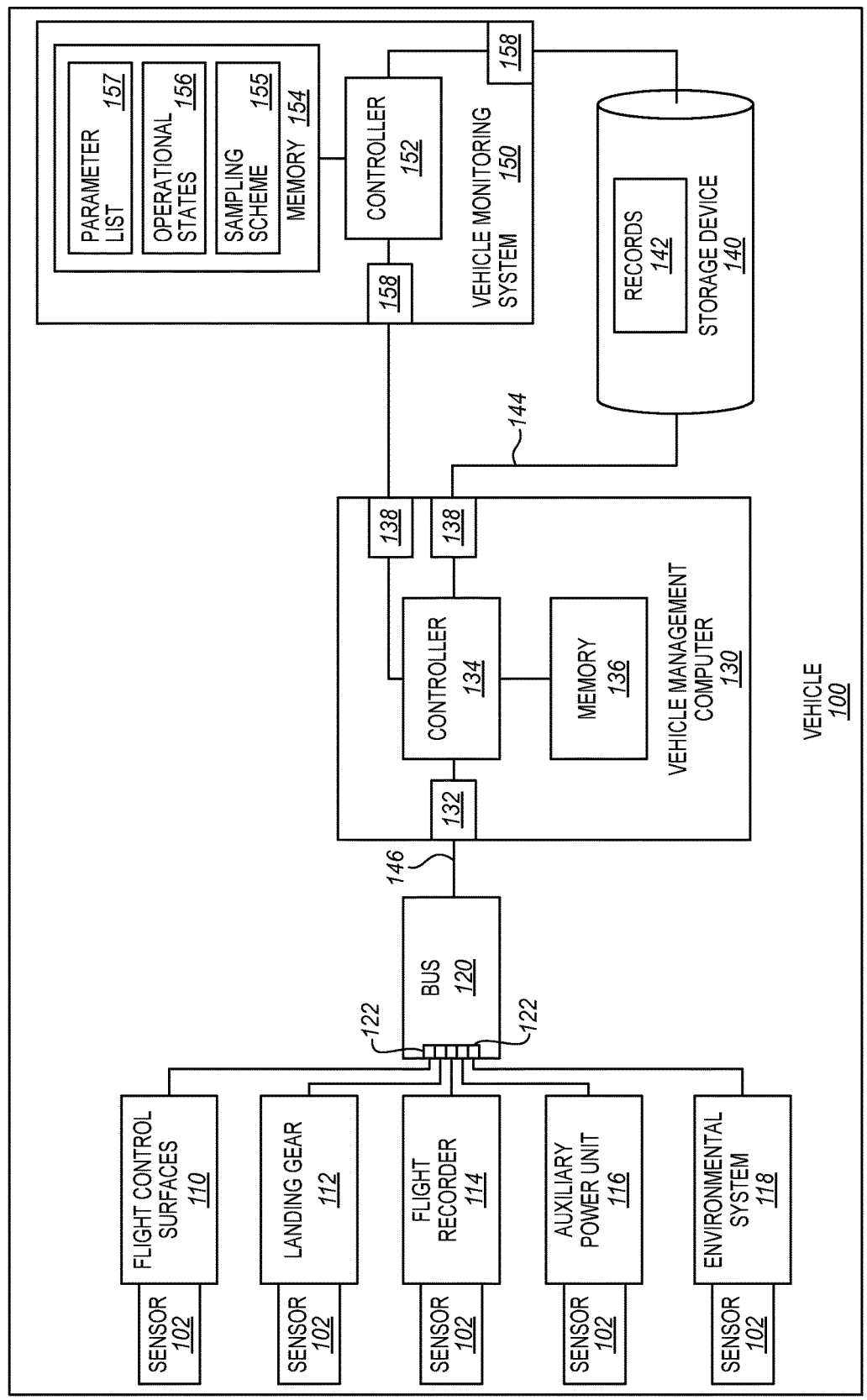
FIG. 1 is a block diagram of a vehicle monitoring system in an illustrative embodiment.

FIG. 1 is a block diagram of a vehicle 100 equipped with a vehicle monitoring system 150 in an illustrative embodiment. According to FIG. 1, vehicle monitoring system 150 receives input from sensors 102. The input describes a variety of systems of vehicle 100. In this embodiment, vehicle 100 comprises an aircraft, and the systems include flight control surfaces 110, landing gear 112, flight recorder 114, an Auxiliary Power Unit (APU) such as APU 116, and environmental system 118 (among others). A variety of sensors 102 may be installed in or proximate to the systems described above. For example, sensors 102 may comprise pressure sensors, accelerometers, temperature sensors, current sensors, voltage sensors, etc., that report values for a variety of parameters describing the current state of systems 110-118. In some embodiments, sensors 102 may report tens or even hundreds of thousands of parameters. Values determined by sensors 102 are applied to addresses 122 at data bus 120 (e.g., an avionic data bus). Furthermore, values applied to data bus 120 by systems 110-118 may be continuously updated. For example, an address 122 at data bus 120 storing a value for a voltage parameter may be updated as quickly as a sensor 102 can measure that voltage (e.g., millions of times per second, or even faster). Thus, values applied to addresses 122 at data bus 120 may change with incredible rapidity. This is notable because data bus 120 does not store previous values for parameters. Hence, once a new value has been applied to an address 122 at data bus 120, the previous value for that parameter is lost.

Vehicle management computer 130 periodically pulls values from data bus 120 by operating an interface (I/F), such as I/F 132, to acquire values via communication channel 146. I/F 132 may comprise a Serial Attached SCSI (SAS) interface, Universal Serial Bus (USB) interface, etc. Communication channel 146 may comprise one or more wires coupled with data bus 120 and I/F 132 that are capable of acquiring data words ("dwords") from data bus 120. The acquisition of values from data bus 120 may be directed by controller 134 based on instructions stored in memory 136. Controller 134 stores values acquired from data bus 120 in records 142 at storage device 140 (e.g., a hard disk, flash memory device, non-volatile Random Access Memory (RAM), etc.) via an I/F 138 (e.g., an Ethernet interface) and a communication channel 144 (e.g., a category 5 (CAT5) cable). Controller 134 may be implemented, for example, as custom circuitry, as a hardware processor executing programmed instructions, or some combination thereof.

Although it may be desirable to record every single value applied to data bus 120 over a period of time, such a large amount of bandwidth may not be supported by communication channel 144 or storage device 140. For example, storage device 140 may be capable of writing less data per second than is generated at data bus 120. In further embodiments, communication channel 144 may itself be incapable of transferring the amount of data generated at data bus 120 per second due to bandwidth or latency issues. Hence, a technological bottleneck results wherein it is not possible to fully store all values applied to data bus 120 at all points in time.

To account for this dilemma, vehicle monitoring system 150 is provided. Vehicle monitoring system 150 operates I/Fs 158 to dynamically acquire and process the values of parameters indicated by records 142. Based on this information, controller 152 determines one or more operational states being experienced by vehicle 100 (e.g., flight characteristics such takeoff, landing, cruising, and health states for individual systems; or an operational age of individual components within individual systems, etc.). These may include conditions experienced by the vehicle 100 as a whole, and/or conditions experienced by individual systems of the vehicle 100. Based on the current operational state(s) of vehicle 100, controller 152 selects rates for retrieving various parameters from addresses 122 at data bus 120. This may involve reducing retrieval rates for some systems and/or parameters in order to provide additional bandwidth which is used to increase retrieval rates for other systems and/or parameters which are of interest. In this manner, controller 152 is capable of dynamically altering what parameters (reported by values at corresponding bus addresses) are stored in records 142, and how quickly values for those parameters are retrieved.

Controller 152 may access the memory 154 in order to facilitate the operations described above. In this embodiment, memory 154 includes parameter list 157, which indicates allowable ranges of retrieval rates for each parameter at data bus 120. Memory 154 additionally stores operational states 156, which indicate what combinations of values may trigger the beginning (or end) of an operational state. Memory 154 also includes sampling schemes 155. Each sampling scheme 155 may define desired retrieval rates for values from one or more addresses at data bus 120. As used herein, the term "retrieval rate" refers to the rate at which values are acquired from data bus 120 by vehicle management computer 130 for storage in records 142, and not to the rate at which sensors 102 apply values to data bus 120.

Controller 152 may be implemented, for example, as custom circuitry, as a hardware processor executing programmed instructions, or some combination thereof. While vehicle monitoring system 150 is presented as a separate computer system from vehicle management computer 130 in FIG. 1, in further embodiments, vehicle monitoring system 150 is integrated into vehicle management computer 130.

With a description of the physical components relating to vehicle monitoring system 150 provided above, further discussion in FIGS. 2-4 focuses upon various tables that may be stored in memory 154.

FIG. 2 is a table illustrating a parameter list 200 in an illustrative embodiment. In this embodiment, parameter list 200 defines a variety of parameters on a system-by-system basis, as well as a nominal retrieval rate, minimum retrieval rate, and maximum retrieval rate for each parameter. Parameter list 200 may also be referred to as a constraint table. Some parameters may have a minimum retrieval rate of zero or null, indicating that they may go untracked for a period of time if desired. By providing a range of retrieval rates allowed for each parameter (e.g., regardless of operational state), parameter list 200 indicates the extent to which each parameter's retrieval rate may be adjusted when operational states change. Parameter list 200 may further indicate which address 122 at data bus 120 holds the value for each parameter. Parameter list 200 may be generated during a design phase prior to vehicle operation, and may utilize engineering knowledge and insights relating to the various systems of vehicle 100.

FIG. 3 is a table illustrating operational states 300 of a vehicle in an illustrative embodiment. In this embodiment, operational states are categorized based on whether they are linked to a specific system or to the entire vehicle. Furthermore, operational states are each assigned a priority and a sampling scheme. If multiple operational states exist at the same time (e.g., landing, and APU fluctuation), then retrieval rates defined in the sampling scheme for the more highly ranked operational state may trump retrieval rates defined in other applicable sampling schemes. In this embodiment, each operational state is also defined by a trigger, which indicates a combination of parameter values used to determine whether the vehicle is in the operational state. For example, an operational state of cruising may be defined by records indicating that altitude is presently between twenty eight and thirty thousand feet.

In further embodiments, the table of FIG. 3 also indicates processing resources to utilize at vehicle management computer 130 when the vehicle 100 is in each of a variety of operational states. These techniques may be valuable when attempting to provide reports, analyses, or summaries of critical parameters on a timely basis and with limited processing resources. In one embodiment, the table of FIG. 3 defines a processing intensity allowed for each of multiple operational states. For example, in order to increase processor reliability or reduce heat generation, a limited number of operations per unit of time may be allowed based upon the current operational state of vehicle 100. One example would be to operate a processor of vehicle management computer 130 at 25% of its rated capacity during cruise, a state where parametric values do not change rapidly. On the other hand, critical operations and maneuvers occur at a much faster rate during landing, and therefore, the processor speed may be increased to 75% of its rated capacity. A second approach includes specifying an increase in processor throughput allowed when monitoring a specific system during an anomalous condition. For example, if a flight management system behaves in a manner that is not expected, the processor throughput could be adjusted to include an additional 10% of rated capacity in order to facilitate capturing and processing additional data.

Furthermore, for complex vehicle monitoring systems that use multiple algorithms to model system health, vehicle monitoring system 150 may define a minimum, nominal, and maximum number of processor operations per unit of time for each of these algorithms. Algorithms that monitor motor health may utilize various computing resources, and the quality of the results of these algorithms may depend on the amount of computing resources used. For instance, a motor winding prognosis algorithm which provides accurate estimates of remaining useful life may require sophisticated modeling based on neural nets, and may utilize multiple processor cycles to complete. Motor winding down-state prediction algorithms, on the other hand, may only utilize a low fidelity data point and a threshold check, and relatively few processor cycles. Processor utilization rates may be predefined when designing vehicle monitoring system 150, and may be based on the computing capabilities of vehicle management computer 130.

FIG. 4 is a table illustrating a sampling scheme 400 defining retrieval rates for one or more parameters in an illustrative embodiment. Memory 154 stores multiple sampling schemes, such as one sampling scheme per operational state. In this embodiment, sampling scheme 400 defines a desired retrieval rate for one or more parameters. Furthermore, sampling scheme 400 assigns a rank to each parameter. In this manner, parameters that are assigned ranks of lower importance may have their sampling rates downgraded first. In environments where multiple operational states (and therefore multiple sampling schemes) apply at once to vehicle 100, rankings for parameters may be assigned according to the sampling scheme for the highest priority operational state.

Allowing each sampling scheme to rank parameters (and hence corresponding addresses of data bus 120) differently provides a technical benefit, because it ensures that data which is being recorded is the most relevant data at the time. For example, if landing gear parameters are not important during cruise, the system can allow those parameters to go untracked or at a downgraded rate of monitoring to accommodate the needs of other parameters that need increased retrieval rates. That is, controller 134 may reduce a retrieval rate for one address 122 at data bus 120, while increasing a retrieval rate for another address 122 at data bus 120.

In summation, vehicle monitoring system 150 stores a variety of information. For example, vehicle monitoring system 150 includes information describing the allowable range of retrieval rates for each parameter. Vehicle monitoring system 150 also includes information indicating what parameter values trigger different operational states, and what sampling schemes to load for different operational states. Based on these sampling schemes, vehicle monitoring system 150 may selectively increase the retrieval rates of specific parameters to facilitate granular tracking, while downgrading retrieval rates of other parameters which are less important at the moment.

Illustrative details of the operation of vehicle monitoring system 150 will be discussed with regard to FIG. 5. Assume, for this embodiment, that vehicle 100 has initialized, and that a default set of parameters is being tracked according to a default sampling scheme.

Figure 5:
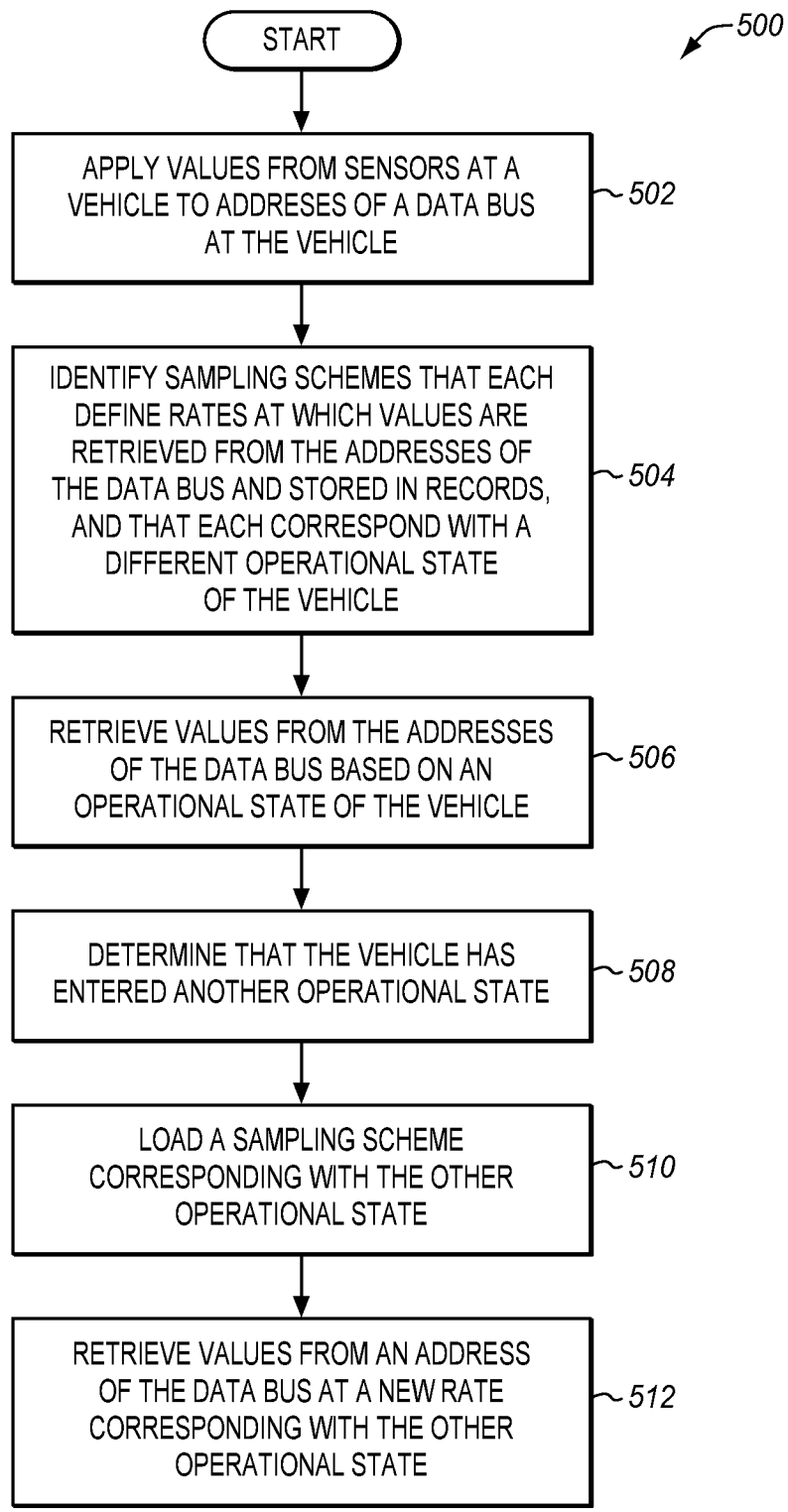
FIG. 5 is a flowchart illustrating a method for operating a vehicle monitoring system in an illustrative embodiment.

FIG. 5 is a flowchart illustrating a method 500 for operating a vehicle monitoring system in an illustrative embodiment. The steps of method 500 are described with reference to vehicle 100 of FIG. 1, but those skilled in the art will appreciate that method 500 may be performed in other vehicles as desired. The steps of the flowcharts described herein are not all inclusive and may include other steps not shown. The steps described herein may also be performed in an alternative order.

As vehicle 100 continues to operate, values from sensors 102 at the vehicle are applied to addresses 122 of data bus 120 at the vehicle (step 502). Vehicle management computer 130 identifies sampling schemes 155, which each define rates at which values are retrieved from addresses 122 of data bus 120 and stored in records 142 (step 504). Each sampling scheme 155 corresponds with a different operational state of vehicle 100.

Vehicle management computer 130 periodically retrieves values from addresses 122 at data bus 120, based on the operational state of the vehicle (e.g., based on a first of sampling schemes 155 corresponding with the operational state of the vehicle), and proceeds to update records 142 (step 506). During this process, controller 152 retrieves the records 142 from storage device 140. As discussed above, records 142 each indicate values of a parameter reported by at least one sensor of a vehicle at a point in time. For example, each record may report one or more values for a parameter acquired by vehicle management computer 130 at different points in time.

Assume, for this embodiment, that vehicle 100 is an aircraft, and that vehicle 100 is proceeding to take off from a runway. This results in changes to values applied to addresses 122 at data bus 120, and these changed values are reflected in records 142 generated by vehicle management computer 130. Based on the records 142, controller 152 determines that vehicle 100 has entered another operational state (step 508). For example, controller 152 may determine that current values of a set of parameters now indicate that vehicle 100 has entered another operational state (e.g., take off), or left an operational state. Given that the operational state of vehicle 100 has changed, controller 152 determines whether, and how, retrieval rates for various parameters should be adjusted.

To this end, controller 152 loads a second of sampling schemes 155 that corresponds with the other operational state (step 510). Controller 152 further retrieves values from an address 122 at data bus 120 at a new rate corresponding with the other operational state (e.g., a new rate defined by a second of sampling schemes 155, which is the current sampling scheme) (step 512). One or more rates indicated in a second of sampling schemes 155 may use an increased amount of bandwidth at communication channel 144, and/or at storage device 140. In order to ensure that no bottlenecking of data occurs, controller 152 may reduce retrieval rates of certain other parameters (at other addresses 122), or cease sampling those other parameters altogether. This may be performed so long as the minimum retrieval rate for each parameter (defined in parameter list 157) is maintained.

In some embodiments, controller 152 may load multiple sampling schemes 155 (each corresponding with a different operational state) in response to determining that vehicle 100 is subject to multiple operational states. In such embodiments, rates indicated in the sampling scheme for the highest priority operating condition may be implemented, followed by rates indicated in the sampling scheme for the next highest priority operating condition. Parameters that do not have a defined retrieval rate in any loaded sampling schema may then have their retrieval rates downgraded to provide bandwidth for the other parameters. Controller 152 then directs controller 134 to adjust how often values for parameters are acquired via I/F 132 and stored in records 142. Steps 508-512 may then be repeated on an ongoing basis in order to dynamically adjust how systems are monitored.

For instance, landing gear parameters may include vibration, position, temperatures, rotational rates and speeds, and tire pressures. This data may be of little interest if the aircraft is in mid-flight at altitude. Vehicle monitoring system 150 may therefore define operational states under which landing gear parameters are valuable (during rollout, takeoff, landing, and taxi, in this case), and then increase retrieval rates of landing gear parameters at during those times. In another example, retrieval rates for parameters relating to composite structural vibration may be downgraded except for during high load conditions, during high angle maneuvers, or when pitch rate exceeds three degrees per second.

Method 500 may further comprise controller 134 generating and transmitting new records (or a summary thereof) for review. For example, records 142 may be transformed into actionable information (e.g., a report), and presented to an appropriate user (e.g., a pilot, maintainer, engineer etc.) via an electronically displayed message, a work order, a text message, or any other suitable format. This actionable information may further indicate operational states that existed when records 142 were generated. Actionable information may facilitate decision-making processes related to shutting down systems, curtailing a flight, limiting the flight or mission envelope, deciding whether to order new parts, deciding whether to perform a repair action, or deciding whether to post an alert regarding the remaining life of a component.

In short, method 500 allows for dynamically varying vehicle monitoring in order to collect, process and store rich data sets that are tailored for the current operational state of a vehicle. This yields more valuable and accurate actionable information for users. Hence, method 500 may help to reduce flight aborts, reduce schedule disruptions, and also reduce maintenance time without the additional burden of a larger, more complex embedded computer system at vehicle 100.

Figure 6:
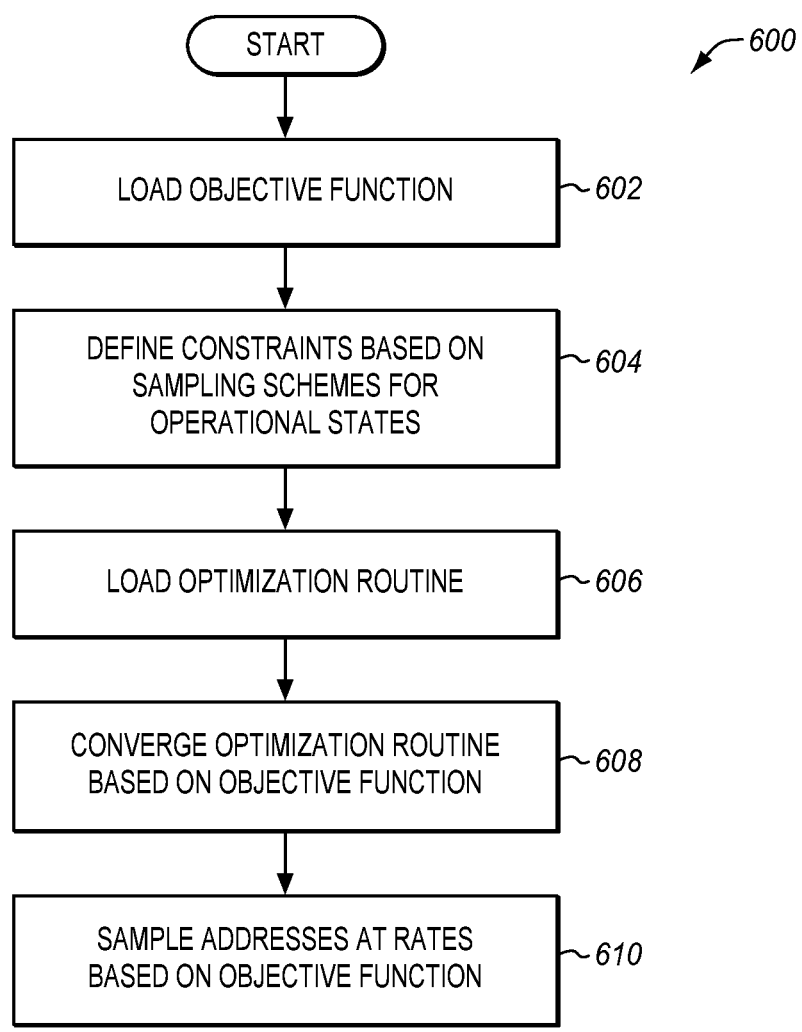
FIG. 6 is a flowchart illustrating details for utilizing an optimization routine to dynamically adjust rates for retrieving values in an illustrative embodiment.

FIG. 6 is a flowchart illustrating a method 600 for utilizing an optimization routine to dynamically adjust sampling rates in an illustrative embodiment. FIG. 6 illustrates that these optimization routines may be implemented with predefined constraints and algorithms for different operational states. Furthermore, the processes described herein may be implemented with linear or non-linear optimization routines. In this embodiment, the objective function and constraints for each of various operational states are predefined.

According to method 600, an objective function is loaded by controller 152 (step 602). An objective function is a formula that outputs a score for a given combination of retrieval rates for parameters. For example, objective functions may comprise linear functions that describe relationships between parameter values, system priorities, and processing constraints. In one embodiment, an objective function may lightly penalize reducing a retrieval rate of a specific parameter, while also heavily penalizing completely halting retrieval of values for that parameter. Different combinations of retrieval rates are scored differently by the objective function, and the resulting scores are utilized as a basis for determining how close a given set of retrieval rates is to a theoretical optimum.

In one embodiment, objective functions for each operational state are defined and included in a table. For example, one objective function may provide a higher score for an increased retrieval rate of wing flap angle, while another objective function for a different operational state may provide a higher score for increasing the retrieval rate of voltage at an APU.

Controller 152 further defines constraints based on sampling schemes for the current operational states (e.g., the loaded sampling schemes) (step 604). These constraints include any required retrieval rates dictated by the sampling schemes. Constraints may further include minimum or maximum retrieval rates defined by parameter list 200.

Controller 152 additionally loads an optimization routine (step 606). An optimization routine may comprise a deterministic or stochastic optimization algorithm, such as algorithms for Monte Carlo optimization, simulated annealing, a Nelder-Mead simplex, etc. Different optimization routines may be utilized for different operational states. These routines seek to maximize data collection/transmission rates within the given constraints while achieving the highest score via the objective function.

With the optimization routine is loaded, controller 152 proceeds to converge the optimization routine based on the objective function (step 608). That is, controller 152 generates multiple different theoretical combinations of sampling rates for the parameters, and scores each combination of retrieval rates. Controller 152 may then iteratively generate new combinations of retrieval rates based on the scores of the previous combinations of sampling rates. In this manner, controller 152 may converge via linear or non-linear optimization techniques at an optimal or near-optimal final combination of retrieval rates.

With a final combination of sampling rates determined based on the objective function, controller 152 directs vehicle management computer 130 to sample the parameters according to the final combination of rates (step 610).

EXAMPLES

Figure 7:
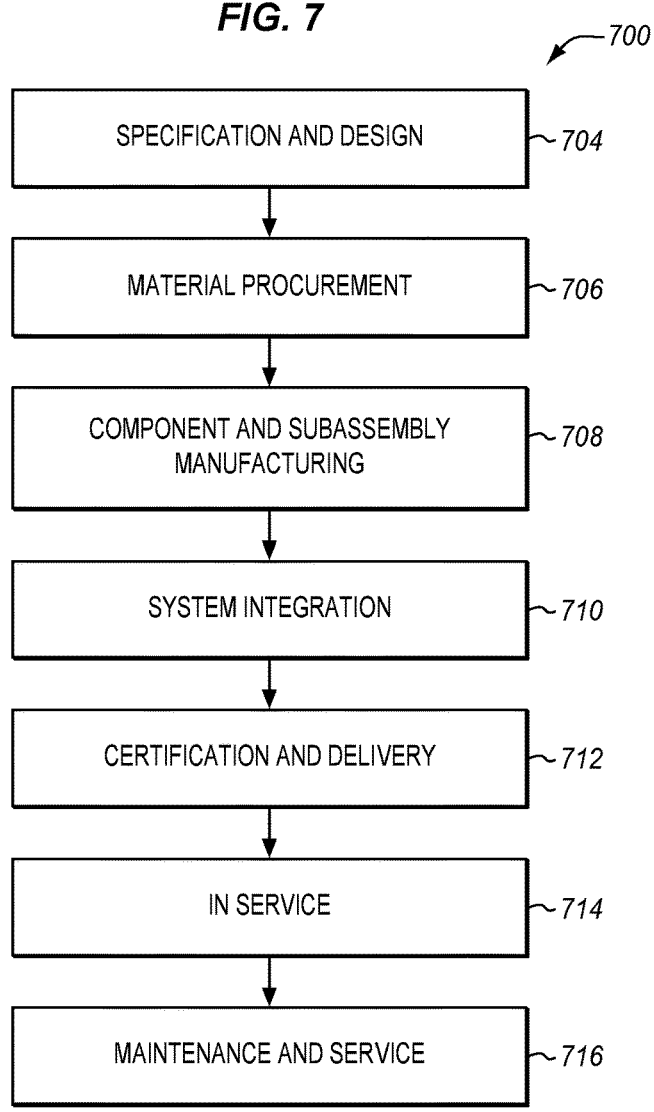
FIG. 7 is a flow diagram of aircraft production and service methodology in an illustrative embodiment.
Figure 8:
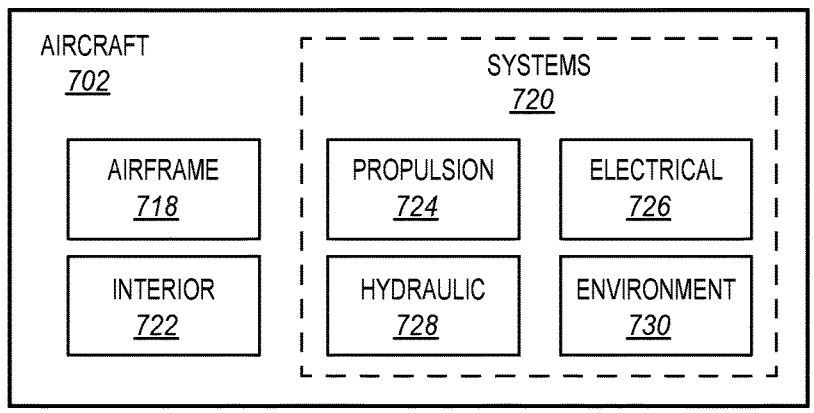
FIG. 8 is a block diagram of an aircraft in an illustrative embodiment.

Referring more particularly to the drawings, embodiments of the disclosure may be described in the context of an aircraft manufacturing and service method 700 as shown in FIG. 7 and an aircraft 702 as shown in FIG. 8. During pre-production, illustrative method 700 may include specification and design 704 of the aircraft 702 and material procurement 706. During production, component and subassembly manufacturing 708 and system integration 710 of the aircraft 702 takes place. Thereafter, the aircraft 702 may go through certification and delivery 712 in order to be placed in service 714. While in service by a customer, the aircraft 702 is scheduled for routine maintenance and service 716 (which may also include modification, reconfiguration, refurbishment, and so on). Apparatus and methods embodied herein may be employed during any one or more suitable stages of the production and service method 700 (e.g., specification and design 704, material procurement 706, component and subassembly manufacturing 708, system integration 710, certification and delivery 712, service 714, maintenance and service 716) and/or any suitable component of aircraft 702 (e.g., airframe 718, systems 720, interior 722, propulsion 724, electrical 726, hydraulic 728, environmental 730).

Each of the processes of method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8, the aircraft 702 produced by illustrative method 700 may include an airframe 718 with a plurality of systems 720 and an interior 722. Examples of high-level systems 720 include one or more of a propulsion system 724, an electrical system 726, a hydraulic system 728, and an environmental system 730. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 700. For example, components or subassemblies corresponding to production stage 708 may be fabricated or manufactured in a manner similar to components or subassemblies produced while the aircraft 702 is in service. Also, one or more apparatus embodiments, method embodiments, or a combination thereof may be utilized during the production stages 708 and 710, for example, by substantially expediting assembly of or reducing the cost of an aircraft 702. Similarly, one or more of apparatus embodiments, method embodiments, or a combination thereof may be utilized while the aircraft 702 is in service, for example and without limitation, to maintenance and service 716. For example, the techniques and systems described herein may be used for steps 706, 708, 710, 714, and/or 716, and/or may be used for airframe 718 and/or interior 722. These techniques and systems may even be utilized for systems 720, including for example propulsion 724, electrical 726, hydraulic 728, and/or environmental 730.

In one embodiment, vehicle monitoring system 150 is assembled into an aircraft in system integration 710, and then is utilized in service 714. During this time, vehicle monitoring system 150 continues to sample parameters at dynamically varying rates, and to generate reports and analysis as desired by users such as technicians and pilots. Inventive components and methods may be utilized throughout component and subassembly manufacturing 708 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method comprising:
    applying values from sensors at a vehicle to addresses of a data bus at the vehicle;
    retrieving values at a first rate from at least one of the addresses of the data bus based on an operational state of the vehicle;
    determining that the vehicle has entered another operational state; and
    retrieving values from the at least one of the addresses of the data bus at a new rate corresponding with the other operational state.

2. The method of claim 1 further comprising:
    storing new records that report values from the address at the new rate.

3. The method of claim 1 further comprising:
    identifying sampling schemes that each define rates at which values are retrieved from the addresses of the data bus and stored in records, and that each correspond with a different operational state of the vehicle, wherein:
    retrieving values from the addresses based on the operational state of the vehicle is based on a first sampling scheme corresponding with the operational state of the vehicle;

retrieving values from an address of the data bus at the new rate is based on a second sampling scheme corresponding with the other operational state.

4. The method of claim 3 wherein:
retrieving values from an address of the data bus at the new rate comprises increasing a first rate at which values are retrieved from a second address of the data bus to utilize additional bandwidth, and the method further comprises:
decreasing a second rate at which values are retrieved from a first address of the data bus in order to provide the additional bandwidth on a communication channel coupled with the data bus.

5. The method of claim 4 further comprising:
dynamically selecting the first address based on a rank assigned to a parameter that corresponds with the first address.

6. The method of claim 5 wherein:
dynamically selecting the first address is performed via an optimization routine, wherein an objective function used by the optimization routine is based on ranks assigned to parameters by the sampling scheme.

7. The method of claim 3 further comprising:
in response to determining that the vehicle is subject to multiple operational states:
loading multiple sampling schemes that each correspond with a different one of the operational states; and
retrieving values from multiple addresses of the data bus at multiple new rates defined by the multiple sampling schemes.

8. The method of claim 1 wherein:
the operational states indicate conditions experienced by the vehicle as a whole, and conditions experienced by individual systems of the vehicle.

9. A non-transitory computer readable medium embodying programmed instructions which, when executed by a processor, are operable for performing a method of:
applying values from sensors at a vehicle to addresses of a data bus at the vehicle;
retrieving values at a first rate from at least one of the addresses of the data bus based on an operational state of the vehicle;
determining that the vehicle has entered another operational state; and
retrieving values from the at least one of the addresses of the data bus at a new rate corresponding with the other operational state.

10. The medium of claim 9, wherein the method further comprises:
storing new records that report values from the address at the new rate.

11. The medium of claim 9, wherein the method further comprises:
identifying sampling schemes that each define rates at which values are retrieved from the addresses of the data bus and stored in records, and that each correspond with a different operational state of the vehicle, wherein:
retrieving values from the addresses based on the operational state of the vehicle is based on a first sampling scheme corresponding with the operational state of the vehicle;
retrieving values from an address of the data bus at the new rate is based on a second sampling scheme corresponding with the other operational state.

12. The medium of claim 11, wherein:
retrieving values from an address of the data bus at the new rate comprises increasing a first rate at which values are retrieved from a second address of the data bus to utilize additional bandwidth, and the method further comprises:
decreasing a second rate at which values are retrieved from a first address of the data bus in order to provide the additional bandwidth on a communication channel coupled with the data bus.

13. The medium of claim 12, wherein the method further comprises:
dynamically selecting the first address, based on a rank assigned to a parameter that corresponds with the first address.

14. The medium of claim 13, wherein:
dynamically selecting the first address is performed via an optimization routine, wherein an objective function used by the optimization routine is based on the ranks assigned to parameters by the sampling scheme.

15. The medium of claim 11, wherein the method further comprises:
in response to determining that the vehicle is subject to multiple operational states at once:
loading multiple sampling schemes that each correspond with a different one of the operational states; and
retrieving values from multiple addresses of the data bus at multiple new rates defined by the multiple sampling schemes.

16. The medium of claim 9, wherein:
operational states indicate conditions experienced by the vehicle as a whole, and conditions experienced by individual systems of the vehicle.

17. A system comprising:
a data bus at a vehicle;
sensors at the vehicle which provide values that are applied to addresses of the data bus such that each address of the data bus corresponds with a different sensor at the vehicle; and
a vehicle monitoring system coupled with the data bus via a communication channel, the vehicle monitoring system comprising:
a controller, implemented by a processor, that identifies sampling schemes stored in a memory that each define rates at which values are retrieved from the addresses of the data bus and stored in records, and that each correspond with a different operational state of the vehicle,
the controller retrieves values from the addresses of the data bus via the communication channel based on a first sampling scheme that corresponds with an operational state and is stored in the memory, determines that the vehicle has entered another operational state based on the records, loads a second sampling scheme that corresponds with the other operational state and is stored in the memory, and retrieves values from an address of the data bus via the communication channel at a new rate defined by the second sampling scheme.

18. The system of claim 17 wherein:
the controller decreases a rate at which values are retrieved from a first address of the data bus in order to provide additional bandwidth on a communication channel coupled with the data bus, and increases a rate at which values are retrieved from a second address of the data bus to utilize the additional bandwidth.

19. The system of claim 18 wherein:
the controller dynamically selects the first address, based on a rank assigned to a parameter that corresponds with the first address.

20. The system of claim 19 wherein:
the controller dynamically selects the first address via an optimization routine, wherein an objective function used by the optimization routine is based on ranks assigned to parameters by the sampling scheme.

21. The system of claim 17 wherein:
in response to determining that the vehicle is subject to multiple operational states at once, the controller loads multiple sampling schemes that each correspond with a different one of the operational states, and retrieves values from multiple addresses of the data bus at multiple new rates defined by the multiple sampling schemes.

22. The system of claim 17 wherein:
the operational states indicate conditions experienced by the vehicle as a whole, and conditions experienced by individual systems of the vehicle.

23. The system of claim 17 wherein:
the vehicle is an aircraft,
the data bus comprises an avionic data bus.

* * * * *